Sept. 12, 1967  S. SASLOW ETAL  3,341,724
BRUSHLESS D-C MOTOR
Filed Nov. 16, 1964  2 Sheets-Sheet 1

SEYMOUR SASLOW
JOHANNES PETER KNAUTH
INVENTORS

BY George B. Oujevolk
ATTORNEY

SEYMOUR SASLOW
JOHANNES PETER KNAUTH
INVENTORS

# United States Patent Office 3,341,724
Patented Sept. 12, 1967

3,341,724
BRUSHLESS D-C MOTOR
Seymour Saslow, Saratoga Springs, and Johannes Peter Knauth, Hurley, N.Y., assignors to Espey Mfg. & Electronics Corporation, Saratoga Springs, N.Y., a corporation of New York
Filed Nov. 16, 1964, Ser. No. 411,472
2 Claims. (Cl. 310—68)

The present invention relates to brushless D-C motors and more particularly to an inverter or converter arrangement for using A-C motors from a D-C source.

Brushless D-C motors are usually nothing more than A-C motors wherein a transistor switching arrangement in push-pull relationship is fed by a D-C source and alternately conducts current across the stator coil of the motor in the one and the other direction. A small D-C motor using a transistor switching arrangement on an A-C motor which is independent of the rotor speed, but whose A-C cycle is fixed by the circuit characteristics of the power transistors and bias resistors has already been described in the Leonard Katz U.S. Patent No. 3,098,958, patented July 23, 1963. According to the Katz patent, the stator winding of the motor is fed by a pair of transistors in push-pull relationship. Coupled to the stator winding is a fixed winding extending to the control electrodes of the transistors in feedback relationship. The time constant is set by two base bias resistors. In this way, an A-C current whose frequency is determined by the circuit characteristics of the feedback path is generated across the stator coil. This frequency can of course be adjusted by changing the resistor values.

Although the foregoing arrangement works well on a breadboard, the lodging of the device described in small spaces poses considerable problem. In motor boats, tanks, submarines, space vehicles, etc., the thing which is least available is space. Every nook and corner is crammed with components of one kind or another. In the aforementioned Katz patent, it was proposed to use the arrangement described therein on a motor of the type like the Aximax 2, 400-cycle, 115-volt, 0.4 ampere blower motor manufactured by Rotron Manufacturing Company of Woodstock, New York. But this motor is already crammed with windings, and there is no logical place to put the extra components required without considerable alteration in the housing design. The particular arrangement described in the Katz patent is useful for small fans. By using the arrangement described, motor manufacturers have to make and stock two very similar motor-fan assemblies, the conventional A-C motor-fan, and, the D-C brushless motor-fan. The D-C motor moreover is of odd size and shape because of the extra windings. To reduce inventory, parts, and increase sales appeal, it is readily apparent that some sort of arrangement is needed whereby the A-C motor can rapidly be transformed into a brushless D-C motor of approximately the same size. However, since the D-C motor requires additional windings as well as a transistor D-C to A-C converter circuit, this is not so readily accomplished.

The present invention relates to an arrangement of components whereby a manufacturer can mass produce and stock almost finished motors, or motor-fan assemblies. The particular kind of motor desired A-C or D-C can readily be finished by the minimum assembling of component by very simple operations.

The invention as well as other objects and advantages thereof will become more apparent from the following description taken in conjunction with the accompanying drawing in which.

Figure 1:
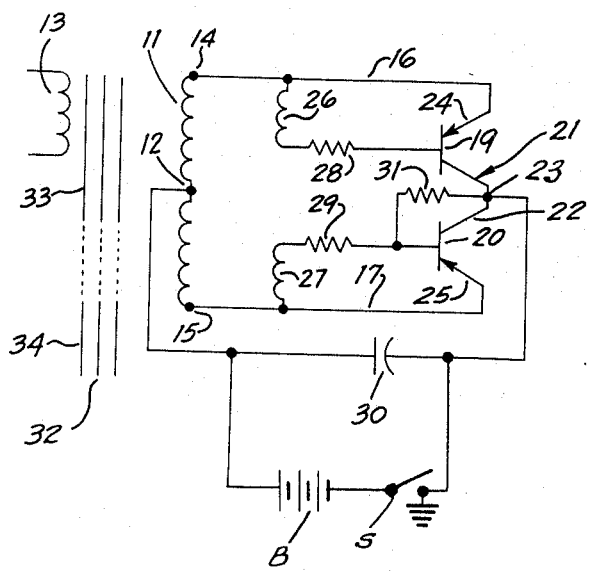
FIGURE 1 is a schematic representation of the motor circuitry.

The circuit of FIGURE 1 has a stator winding 11, with a center tap 12. The rotor winding 13 is shown merely to complete the similarity of FIGURE 1, to the corresponding figure in the Katz prior art patent. The upper and lower terminals 14 and 15 of the stator winding are connected by lines 16 and 17 to a pair of transistors 19 and 20 in push-pull relationship. The transistor collectors 21 and 22 are connected at a junction point 23; lines 16 and 17 are connected to the emitters 24 and 25. The bases of the transistors are controlled by a pair of second windings 26 and 27. This pair of second windings are wound right on top of the first winding and are connected to the base across resistors 28 and 29. A capacitor 30 is in parallel with the switch S and battery B between center tap 12 and collector junction 23 to protect the transistors from transient fluctuations in the power supply. A base bias resistor 31 in series with resistor 29 of second winding 27 is also provided.

Except for the capacitor 30, the circuit described is almost identical with that of the aforementioned Katz patent. The problem is to arrange the components just described in such a way that they can readily be mounted on an A-C motor. In the circuit of FIGURE 1, attention is now directed to core arrangement 32, illustrated schematically as two sets of three parallel lines with dots in between.

Figure 2:
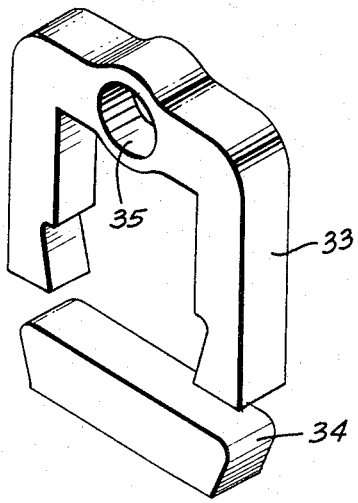
FIGURE 2 illustrates one of the components useful in connection with the present invention; and, FIGURE 3 shows in perspective a rear view of the components required to convert an A-C motor to a D-C motor.
Figure 3:
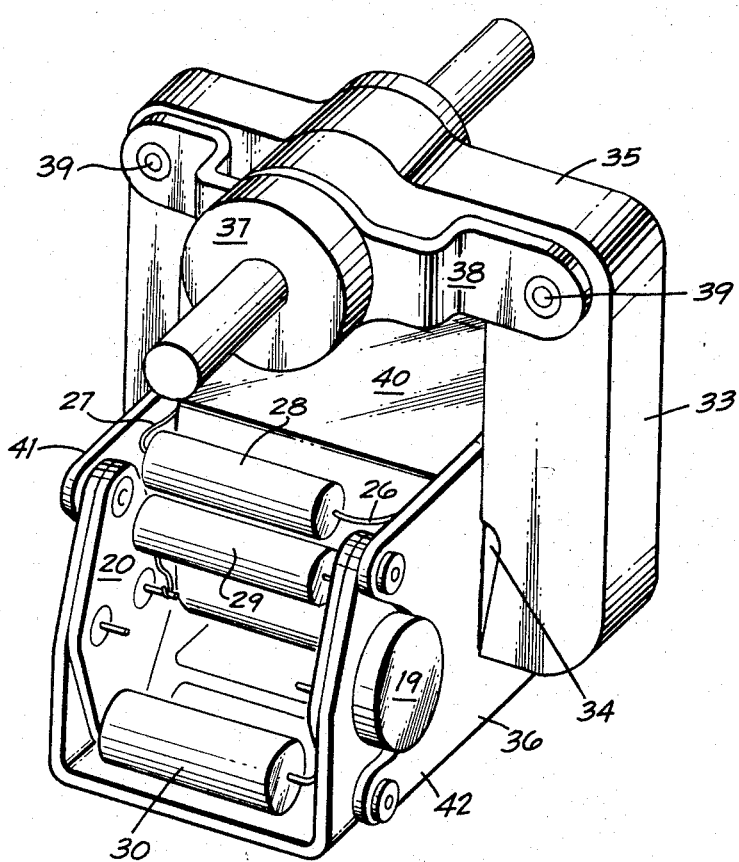

The core piece construction is provided in perspective in FIGURE 2 and shown as consisting of a horseshoe yoke 33 and a base 34. Base 34 is an elongated piece with two rectangular and two trapezoidal faces so as to have somewhat of a wedge shape. The ends of yoke 33 have a corresponding inwardly recessed shape to receive base 34 so that it will be firmly wedged there. The yoke includes a rotor housing aperture in the horseshoe center. The yoke 33 forms a permanent part of the motor structure and an entire device such as a fan can be made so that it can be used with A-C or D-C by simply adding the D-C unit at the rear. This is shown in FIGURE 3 depicting the rear of a motor 35 which has the D-C unit 36 mounted thereto. Yoke 33 has the rotor assembly 37 mounted therein and held by a bracket 38 fastened to the yoke by fastening means 39.

Now the only difference between an A-C motor and a D-C motor is the D-C unit 36. The motor can rapidly be reconverted back into an A-C motor by removing unit 36 and substituting another A-C unit instead.

On the D-C unit 36 there is a coil and core assembly 40. In this coil and core assembly 40 is wedge shaped core base 34. Wound on this wedge shaped core base 34 is the stator winding 11. Around stator winding 11 are a pair of second windings 26 and 27. The three sets of windings are covered by an insulating cover visible over the three sets of windings. The coil and core assembly is held between two side plates 41 and 42 having two-side openings, such as opening 43. Through these openings pass the ends of wedge shaped core base 34 to be held in the yoke 33. To the rear of coil and core assembly 40, disposed in each side plate are two power transistors 19 and 20. The collector electrodes are grounded one to each side plate 41 and 42 and, capacitor 30 is disposed laterally across the width of the unit between the side plates. The connection of lines 16 and 17 between the bases of the transistors and the upper and lower ends 14 and 15 of the windings are not visible from the view shown, but this is an obvious connection to any person skilled in the art. The lead lines from windings 26 and 27 to resistors 28 and 29 are shown, the resistors 28 and 29 are disposed across the width of the unit parallel to capacitors 30. Resistor 31 of FIGURE 1 corresponds to the ground resistor 31 in FIGURE 3.

The dispositions of the components shown in FIGURE 3 can be changed somewhat by using the plates 41 and 42 as the ground circuit.

It is to be observed that the present invention provides for a motor with a D-C converter unit to be affixed to the motor and includes a stator horseshoe yoke core, having two end legs, a rotor mounted therein, an elongated core piece designed to fit between said end legs, a stator winding around said elongated core piece, a second winding set around said elongated stator core coaxial with said stator winding; side plates with a window opening therein, said elongated core piece passing therethrough, and, a D-C to A-C conversion circuit mounted between said side plates and coupled to said stator winding and second winding set, said second winding set acting on the transistor bases to perform the A-C switching.

Although the present invention has been described in conjunction with preferred embodiments, it is to be understood that modifications and variations may be resorted to without departing from the spirit and scope of the invention as those skilled in the art will readily understand. Such modifications and variations are considered to be within the perview and scope of the invention and appended claims.

We claim:

1. An arrangement for converting a conventional A-C motor for use with a D-C source, comprising in combination; a stator yoke core of generally horseshoe configuration, said core including two side legs and a top cross portion, an aperture in the center of said cross portion for receiving the rotor of said motor, an elongated core piece designed to fit and to be retained between said side legs adjacent the ends thereof, a stator winding around said elongated core piece including end terminals, a second winding set around said elongated core piece including end terminals, said second winding set being coaxial with said stator winding, parallel side plates disposed normal to said elongated core piece for holding sandwiched electronic circuit components therebetween including D-C input power terminals and a pair of power transistors, one mounted in each of said side plates, the stator winding end terminals being connected to the emitters thereof, the second winding set end terminals being connected to the bases thereof, the collectors being connected to said power terminals, and, windows in said side plates through which said elongated core piece is adapted to pass through.

2. A device in claim 1, wherein said elongated core piece has slanting end faces defining a wedge shape, said two side legs being inwardly recessed to receive and retain said end faces.

References Cited

UNITED STATES PATENTS

| | | | |
|---|---|---|---|
| 2,719,944 | 10/1955 | Brailsford | 310—46 |
| 2,814,769 | 11/1957 | Williams | 318—138 |
| 2,827,625 | 3/1958 | Greenblott | 335—219 |
| 3,098,958 | 7/1963 | Katz | 318—138 |
| 3,171,072 | 2/1965 | Adair | 318—138 |
| 3,211,959 | 10/1965 | Kirk | 317—100 |

MILTON O. HIRSHFIELD, *Primary Examiner.*

J. D. MILLER, *Assistant Examiner.*